3,332,990
PROCESS FOR THE PREPARATION OF 3,4-DINITROBENZOIC ACID

Sigurd Hartung, Cologne-Mauenheim, and Herbert Grünewald, Leverkusen, Germany, assignors to Farbenfabriken Bayer Aktiengesellschaft, Leverkusen, Germany, a corporation of Germany
No Drawing. Filed July 20, 1964, Ser. No. 383,930
Claims priority, application Germany, Aug. 8, 1966, F 40,453
11 Claims. (Cl. 260—524)

The invention relates to a process particularly advantageous for use on a commercial scale for the preparation of 3,4-dinitro-benzoic acid by selective oxidation of a mixture of dinitrotoluenes.

It is known that all dinitrobenzoic acids can be prepared by oxidation of dinitrotoluenes (see Beilstein's Handbuch der Organischen Chemie, vol. IX, pp. 411–413).

It was therefore to be expected that oxidation of a mixture of dinitrotoluenes with the usual oxidising agents would lead to a mixture of isomeric dinitrobenzoic acids. To prepare 3,4-dinitrobenzoic acid, one would then either have to oxidise pure 3,4-dinitrotoluene, which can only be synthesised with difficulty or 3,4-dinitrobenzoic acid would have to be separated from the resulting mixture of isomeric dinitrobenzoic acids by complicated methods of purification.

It has now been found, that 3,4-dinitrobenzoic acid can be obtained pure in high yield by partially oxidising a mixture of isomeric dinitrotoluenes with an inorganic oxidising agent, if necessary in the presence of solvents. In this way, it is possible to oxidise the 3,4-dinitrotoluene present in the dinitrotoluene mixture almost completely to 3,4-dinitrobenzoic acid whilst the remaining dinitrotoluenes remain unchanged.

Isomeric mixtures of dinitrotoluene suitable for the process of the invention are those which contain between 40 and 99% by weight of 3,4-dinitrotoluene, preferably the mixture that is obtained by nitration of 3-nitrotoluene. This contains approximately 55% 3,4-dinitrotoluene, 33% 2,3-dinitrotoluene and 12% 2,5-dinitrotoluene.

Suitable for use as the inorganic oxidising agent are dichromate, e.g. 30 to 80% by weight of aqueous sodium dichromate solutions, and aqueous nitric acid, e.g. in a concentration of 10 to 50% by volume.

Suitable for use as solvents are organic solvents which are substantially resistant to oxidation under the reaction conditions, for example chlorinated hydrocarbons such as chloroform, carbon tetrachloride, organic acids such as acetic acid and nitrated hydrocarbons such as nitrobenzene. In case aqueous solutions of bichromate and nitric acid are used, sulfuric acid or water serves as solvent.

The reaction is carried out at temperatures of 0 to 250° C. depending on the oxidising agent. When working with nitric acid, a temperature of between 150 and 180° C. is preferably observed.

The selective oxidation according to the invention may be carried out by placing the mixture of dinitrotoluene isomers, if necessary together with a solvent, in a suitable vessel and adding the inorganic oxidising agent again, if necessary, in a solvent. In this process, only the 3,4-dinitrotoluene of the isomeric mixture is oxidised.

In the following examples, the inorganic oxidising agent used for the selective oxidation according to the invention is a 78% aqueous sodium dichromate solution, and the dinitrotoluene mixture obtained is a product resulting from nitration of 3-nitrotoluene and containing 53% 3,4-dinitrotoluene. Table 1 shows the dependence of the melting points of the dinitrobenzoic acid obtained upon the quantity of the sodium dichromate solution added (in percent) of the required quantity used for total oxidation of isomeric mixture:

TABLE 1

| Dichromate, percent: | M.P. of dinitrobenzoic acid (theory 161° C.), ° C. |
|---|---|
| 53 | 160 |
| 60 | 152 |
| 70 | 139 |

Thus a practically pure 3,4-dinitrobenzoic acid is obtained when sufficient dichromate is added to oxidise the 3,4-dinitrotoluene. Therefore the dichromate is preferably used in an amount corresponding to the required amount for oxidizing the 3,4-dinitrotoluene in the mixture of isomeric dinitrotoluenes. Oxidation of the other isomers does not then occur. Normal pressure is preferably employed in this method of carrying out the process.

If 30% aqueous nitric acid is used as inorganic oxidising agent for the partial oxidation according to the invention, it is possible to use an excess of oxidising agent. In this case, oxidation is rendered selective by the choice of reaction conditions. Table 2 shows the oxidation of a mixture of isomeric dinitrotoluene with approximately 52% 3,4-dinitrotoluene at various reaction times and temperatures.

TABLE 2

| | Temperature, ° C. | Time in hours | 3,4-dinitrobenzoic acid calculated on the 3,4-dinitrotoluene used, percent | M.p.,[1] ° C. |
|---|---|---|---|---|
| 1 | 160 | 4.5 | 70 | 160 |
| 2 | 170 | 4.5 | 100 | 159 |
| 3 | 180 | 4.5 | 115 | 148 |
| 4 | 170 | 1.5 | 50 | 160 |

[1] Theoret. M.P. 161° C.

In this method of carrying out the process, selective oxidation is possible at temperatures between about 160 and 180° C. at reaction times of between 1 and 5 hours. When using nitric acid as oxidising agent, the process should be carried out at increased pressure, say between 10 and 100 atmospheres above atmospheric pressure.

To work up the oxidation mixture, the sparingly soluble 3:4-dinitrobenzoic acid is crystallised and isolated by suction filtration or centrifuging. Crystallisation can be accelerated with suitable solvents, preferably solvents in which the acid is sparingly soluble but the dinitrotoluene readily soluble, e.g. benzene, tetrachloromethane and chloroform.

It is also possible to extract the acid formed from the oxidation mixture, e.g. with soda solution, thus separating it from unchanged dinitrotoluenes. Subsequent working up is carried out in known manner.

The special advantage of the process according to the invention is that isomeric mixtures of dinitrotoluenes, especially that obtained from nitration of 3-nitrotoluene, can be used for the preparation of 3,4-dinitrobenzoic acid. It is not necessary to purify first the 3,4-dinitrotoluene and then subject it to oxidation.

Another advantage is that the resulting 3,4-dinitrobenzoic acid is very pure and therefore no elaborate separation of mixtures of isomeric dinitrobenzoic acids is required.

3,4-dinitrotoluene obtained in the crude dinitrotoluene mixture can thus be converted completely and simply into 3,4-dinitrobenzoic acid.

Another advantage of the process of the invention is that the preparation of 3,4-dinitrobenzoic acid can be carried out continuously from mixtures of dinitrotoluene isomers. For this purpose, dinitrotoluenes and 30% nitric acid in a ratio by weight of 1:5 are pumped continuously, for example simultaneously into a suitable reaction vessel. The reaction vessel may consist of one vessel or of several vessels arranged side by side. As the reaction period of the mixture is completed, the mixture is continuously removed, cooled and the crude 3,4-dinitrobenzoic acid removed. It is dissolved in a solution of sodium carbonate and the solution extracted with benzene. The benzene layer is separated. It contains the residual dinitrotoluenes. The pure 3,4-dinitrobenzoic acid can be separated by adding of e.g. diluted sulfuric acid to the alkaline solution. The crystals produced are filtered off, washed and dried.

3,4-dinitrobenzoic acid is a valuable intermediate product for pharmaceuticals, plant protective agents and dyestuffs. The invention will be more easily understood on the basis of the following examples, which are illustrative but not limitative.

*Example 1*

7 kg. dinitrotoluene having the following composition:

| | Percent |
|---|---|
| 3,4-dinitrotoluene | 96.9 |
| 2,3-dinitrotoluene | 2.3 |
| 2,5-dinitrotoluene | 0.5 | is oxidised in the usual way in sulfuric acid solution with 1120 g. $Na_2Cr_2O_7 \cdot 2H_2O$ at 45° C. The mixture is then stirred for 3 hours and the precipitated crystals are removed by suction filtration. They are washed several times with water to remove acid and the filter cake is then dissolved in sufficient soda solution to render the resulting solution alkaline and is again suction filtered, washed with water, then precipitated by adding of diluted sulfuric acid, and dried in a drying cupboard under vacuum. The yield of dinitrobenzoic acid is 7.794 kg.=95.6% of theory; M.P. 160° C.

The residue remaining on the filter is dried and extracted with benzene in a Soxhlet. The extract contains 330 g. dinitrotoluene.

*Example 2*

182 g. dinitrotoluene of M.P. 20.6° C., having the following composition:

| | Percent |
|---|---|
| 3,4-dinitrotoluene | 55 |
| 2,3-dinitrotoluene | 33 |
| 2,5-dinitrotoluene | 12 | is oxidised in the usual way with 149 g. $Na_2Cr_2O_7 \cdot 2H_2O$ in sulphuric acid solution at 60° C. 100 ml. benzene are then added, the crystals which form being filtered off with suction and worked up as indicated in Example 1.

The benzene solution in the filtrate is separated and the benzene removed by evaporation.

114 g. of dinitrotoluene is used, containing 48 g. 3,4-dinitrotoluene.

The yield of 3,4-dinitrobenzoic acid calculated on the reacted 3,4-dinitrotoluene=98% of the theory.

*Example 3*

20 g. dinitrotoluene containing approximately—

| | Percent |
|---|---|
| 3,4-dinitrotoluene | 55 |
| 2,3-dinitrotoluene | 33 |
| 2,5-dinitrotoluene | 12 | is heated with 100 ml. 30% nitric acid for 4.5 hours at 170° C. The contents of the vessel are then cooled and treated with 100 ml. benzene. The crystals formed are filtered with suction, washed with 50 ml. benzene and dried. 3,4-dinitrobenzoic acid 11 g., M.P. 158–159° C.

4.5 g. of dinitrotoluene which consists of 0.9 g. 3,4-dinitrotoluene and 3.6 g. 2,3- and 2,5-dinitrotoluene can be obtained from the benzene in the filtrate.

*Example 4*

15 g. dinitrotoluene of the same composition as in Example 3 are heated for 4.5 hours at 170° C. with 100 ml. 20% nitric acid. The product is worked up as indicated in Example 3.

Dinitrobenzoic acid _____ 10 g., M.P. 156° C.
Dinitrotoluene _____ 5 g.

This contains 0.5 g. 3,4-dinitrotoluene, 4.5 g. 2,3- and 2,5-dinitrotoluene.

*Example 5*

20 g. dinitrotoluene having the composition given in Example 3 are heated with 100 ml. 30% nitric acid for 4.5 hours at 180° C. then cooled and worked up as indicated in Example 3.

Dinitrobenzoic acid _____ 14.5 g., M.P. 148° C.
Dinitrotoluene _____ 5 g.

This contains 0.4 g. 3,4-dinitrotoluene, 4.6 g. 2,3- and 3,4-dinitrotoluene.

What we claim is:

1. Process for the selective preparation of 3,4-dinitrobenzoic acid which comprises contacting an isomeric mixture of dinitrotoluenes consisting of 3,4-dinitrotoluene, 2,3-dinitrotoluene and 2,5-dinitrotoluene with an inorganic oxidizing agent selected from the group consisting of dichromate and nitric acid at a temperature between about 0 and 250° C. to oxidize selectively thereby the 3,4-dinitrotoluene content of said isomeric mixture to the corresponding 3,4-dinitrobenzoic acid, and recovering such 3,4-dinitrobenzoic acid from the resulting reaction mixture.

2. Process according to claim 1 wherein said isomeric mixture contains between about 40 and 99% by weight of 3,4-dinitrotoluene.

3. Process according to claim 2 wherein said contacting is carried out in the presence of a solvent selected from the group consisting of organic solvents, sulfuric acid and water.

4. Process according to claim 2 wherein said oxidizing agent is 30–80% by weight aqueous sodium dichromate solution.

5. Process according to claim 4 wherein said contacting is carried out at normal pressure in sulfuric acid solution with the amount of dichromate required to oxidize correspondingly just the 3,4-dinitrotoluene content in said isomer mixture.

6. Process according to claim 2 wherein said oxidizing agent is 10–50% by volume aqueous nitric acid.

7. Process according to claim 6 wherein said contacting is carried out at a temperature between about 150–180° C. and at a pressure between about 10–100 atmospheres above atmospheric pressure with an excess of nitric acid over that required to oxidize correspondingly just the 3,4-dinitrotoluene content in said isomer mixture.

8. Process according to claim 2 wherein said contacting is carried out in the presence of an organic solvent.

9. Process according to claim 8 wherein said organic solvent is selected from the group consisting of chlorinated hydrocarbon and nitrated hydrocarbon.

10. Process according to claim 2 wherein said 3,4-dinitrobenzoic acid is recovered by crystallization from the reaction mixture.

11. Process according to claim 2 wherein said 3,4-dinitrobenzoic acid is recovered by extraction of the mixture with soda solution.

References Cited

UNITED STATES PATENTS 1,458,491  6/1923  McKee et al. _____ 260—524
1,458,715  6/1923  Lloyd et al. _____ 260—524

LORRAINE A. WEINBERGER, *Primary Examiner.*

SIDNEY B. WILLIAMS, JR., *Assistant Examiner.*